United States Patent
Tsirkin et al.

(10) Patent No.: US 10,534,921 B2
(45) Date of Patent: *Jan. 14, 2020

(54) COPY AND DECRYPT SUPPORT FOR ENCRYPTED VIRTUAL MACHINES

(71) Applicant: Red Hat, Inc., Raleigh, NC (US)

(72) Inventors: Michael Tsirkin, Westford, MA (US); Henri van Riel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/684,908

(22) Filed: Aug. 23, 2017

(65) Prior Publication Data

US 2019/0065756 A1 Feb. 28, 2019

(51) Int. Cl.
*G06F 21/60* (2013.01)
*G06F 9/455* (2018.01)
(Continued)

(52) U.S. Cl.
CPC ........ *G06F 21/602* (2013.01); *G06F 9/45558* (2013.01); *G06F 12/1408* (2013.01); *G06F 12/1425* (2013.01); *G06F 21/53* (2013.01); *G06F 21/78* (2013.01); *H04L 9/08* (2013.01); *H04L 9/088* (2013.01); *G06F 2009/45587* (2013.01); *G06F 2212/1052* (2013.01); *G06F 2221/0753* (2013.01); *G06F 2221/0755* (2013.01); *G06F 2221/2107* (2013.01)

(58) Field of Classification Search
CPC ............... G06F 21/602; G06F 9/45558; G06F 12/1408; G06F 21/53; G06F 12/1425; G06F 21/78; H04L 9/08; H04L 9/088
See application file for complete search history.

(56) References Cited

U.S. PATENT DOCUMENTS

| 6,789,156 B1 * | 9/2004 | Waldspurger ....... G06F 12/1018 711/6 |
| 7,484,208 B1 * | 1/2009 | Nelson ................ G06F 9/45558 718/1 |

(Continued)

OTHER PUBLICATIONS

Andrew S. Tanenbaum, "Structured COmputer Organization," second edition, 1984, pp. 10-12. (Year: 1984).*

(Continued)

*Primary Examiner* — Luu T Pham
*Assistant Examiner* — Canh Le
(74) *Attorney, Agent, or Firm* — Lowenstein Sandler LLP

(57) ABSTRACT

Systems and methods for copy and decrypt support for encrypted virtual machines are disclosed. An example method may include receiving, at a source host machine hosting a virtual machine (VM), a request to migrate the VM to a destination host machine, identifying a first page of memory of the VM on the source host machine for migration, write-protecting the first page, the first page of memory encrypted with a VM-specific encryption key, allocating a second page, executing a copy-and-reencrypt command using the first page and the second page as parameters for the copy-and-reencrypt command, the copy-and-reencrypt command to output the second page comprising contents of the first page re-encrypted with a migration key, and transmitting contents of the second page to the destination host machine.

20 Claims, 7 Drawing Sheets

(51) Int. Cl.
*H04L 9/08* (2006.01)
*G06F 12/14* (2006.01)
*G06F 21/53* (2013.01)
*G06F 21/78* (2013.01)

(56) References Cited

U.S. PATENT DOCUMENTS

| | | | |
|---|---|---|---|
| 8,924,720 | B2 | 12/2014 | Raghuram et al. |
| 9,514,313 | B2 | 12/2016 | Angelo et al. |
| 9,578,017 | B2 | 2/2017 | Ferguson et al. |
| 9,626,302 | B2 | 4/2017 | Marinelli et al. |
| 2009/0276771 | A1* | 11/2009 | Nickolov ............. G06F 9/4856 717/177 |
| 2011/0010515 | A1* | 1/2011 | Ranade ............... G06F 11/1451 711/162 |
| 2011/0302577 | A1* | 12/2011 | Reuther ............. G06F 9/45558 718/1 |
| 2014/0208111 | A1 | 7/2014 | Brandwine et al. |
| 2015/0149999 | A1* | 5/2015 | Ramanathan ........ G06F 9/4856 718/1 |
| 2015/0242159 | A1* | 8/2015 | Tsirkin ................ G06F 3/0647 711/162 |
| 2015/0326542 | A1 | 11/2015 | Serebrin |
| 2015/0381589 | A1* | 12/2015 | Tarasuk-Levin .... H04L 63/0428 713/193 |
| 2016/0266919 | A1 | 9/2016 | Wang |
| 2016/0371106 | A1 | 12/2016 | Hepkin et al. |
| 2018/0247082 | A1* | 8/2018 | Durham .................... G06F 8/63 |

OTHER PUBLICATIONS

Pankajdeep Kaur et al., "Virtual Machine Migration in Cloud Computing," vol. 8, No. 5, 2005, pp. 227-342. (Year: 2005).*

Mahdi Aiash et al., "Secure Live Virtual Machines Migration: Issues and Solutions," IEEE Computer Society, 2014, pp. 160-165. (Year: 2014).*

Hu, Yaohui et al., "Performance Analysis of Encryption in Securing the Live Migration of Virtual Machines", Computer Science, State University of New York at Binghamton, https://kartikgopalan.github.io/publications/hu15performance.pdf, 8 pages.

4.10. Encryption, https://access.redhat.com/documentation/en-US/Red_Hat_Enterprise_Linux/7/html/Security_Guide/sec-Encryption.html, 15 pages, May 3, 2017.

* cited by examiner

COPY AND DECRYPT SUPPORT FOR ENCRYPTED VIRTUAL MACHINES

TECHNICAL FIELD

The disclosure is generally related to virtualization systems, and is more specifically related to copy and decrypt support for encrypted virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
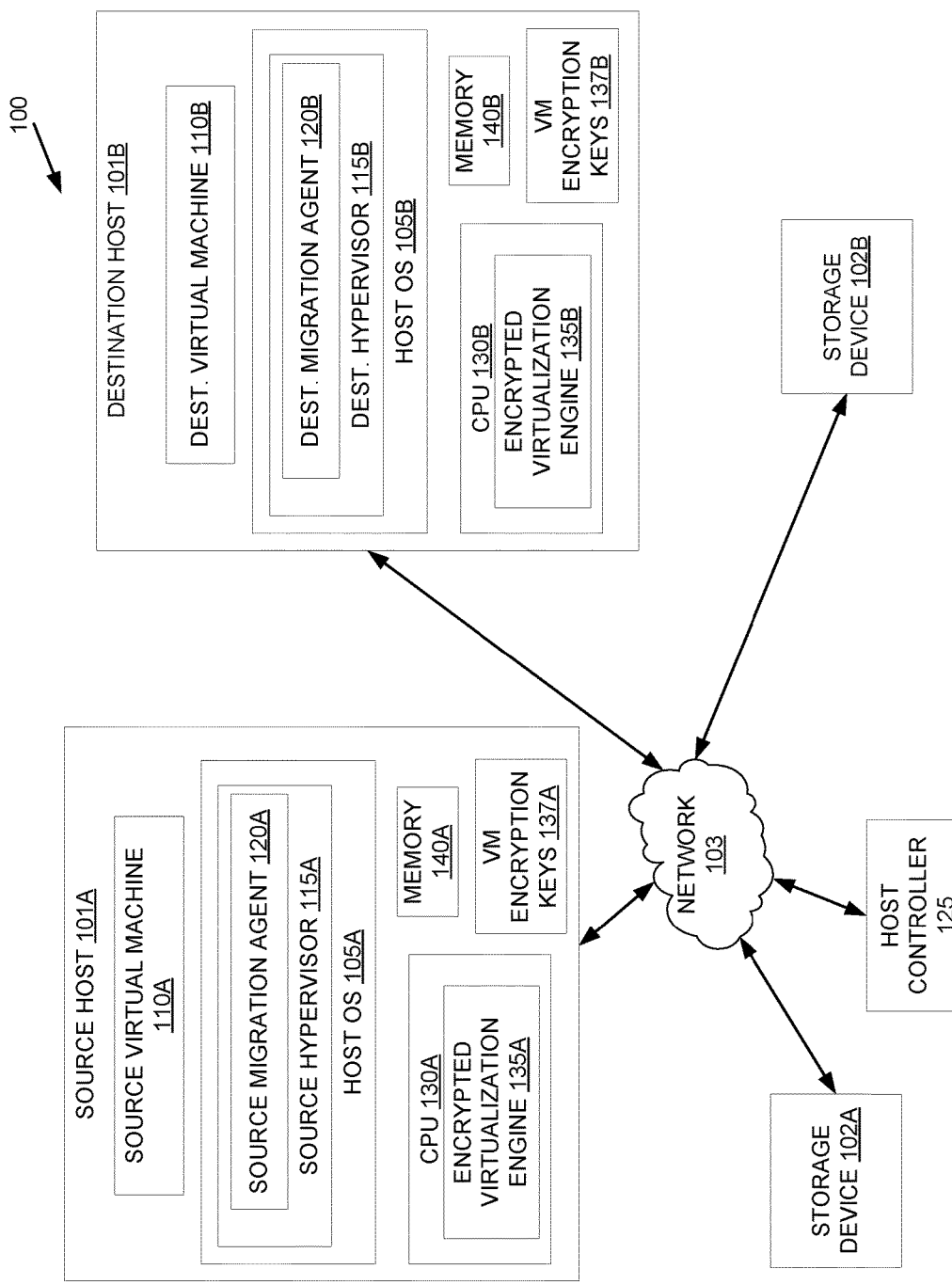
FIG. 1 depicts a high-level diagram of an example distributed computing system in accordance with one or more aspects of the disclosure.

Described herein are methods and systems for copy and decrypt support for encrypted virtual machines (VMs). Encrypted virtualization provides a security paradigm that protects VMs from physical threats, as well as other VMs and the hypervisor. In one implementation, encrypted VMs may be provided using a Secure Encrypted Virtualization (SEV) feature set. When encrypted virtualization is enabled, an encryption engine (e.g., firmware, circuitry of a processing device, etc.) of a host machine hosting the VM can tag all code and data with a VM identifier (ID) that indicates which VM that data originated from or is intended for. This tag is kept with the data at all times and prevents that data from being used by anyone other than the owner. Private memory of a VM is encrypted with a VM-specific key that is generated and maintained by the encryption engine (and which only the encryption engine knows), where the VM-specific key is associated with the VM ID of the VM. The encryption engine provides strong cryptographic isolation between VMs, as well as between the VMs and the hypervisor.

However, a limitation of conventional encrypted virtualization is lack of support for live migration. VM migration refers to the process of stopping execution of a VM at a first computing device (e.g., source host machine), transferring the state of the VM to a second computing device (e.g., destination host machine), and resuming execution of the VM at the second computing device. Live VM migration (also referred to as live migration) is a migration of a VM that occurs with minimal to no downtime (i.e., execution within the VM seemingly does not stop; VM continues to serve clients) of the VM.

Conventionally, when an encrypted VM is migrated, the source host machine executes a command to decrypt each page of the VM (using the guest-specific key of the encryption engine) and re-encrypt each page with a migration key (e.g., using a cryptographic context that is established with the destination host machine). However, as VM accesses can only be decrypted with the guest-specific key of the encryption engine, this means that the VM is not able to access those pages of the VM that have been re-encrypted with the migration key during migration. This results in degraded performance of the host machine due to increased downtime of the VM from the inability to access memory pages of the VM during migration.

Implementations of the disclosure optimize the inefficiencies of live migration of encrypted VMs by providing copy and decrypt support for encrypted VMs. Implementations of the disclosure provide enhanced hardware support (e.g., a new instruction) to decrypt and reencrypt VM memory pages in place. In one implementation, "in place" refers to modifying the contents of a memory page without copying or moving the contents to a different location (i.e., the original contents are changes to modified contents and the original contents are no longer accessible). This new instruction (a copy-and-reencrypt command) results in a copy of the VM memory page that is used for transmission during the migration process, while leaving the original encrypted VM memory page in place for access by the source VM. The new instruction is implemented as part of the processor instruction set and/or as a new command executable by firmware of the host machine. The new instruction can be utilized by the hypervisor for an improved live migration process.

Implementations of the disclosure provide a technical improvement over the conventional systems by providing a properly-encrypted VM memory page for migration at the same time as providing an encrypted version of the same VM memory page that is accessible by the source VM during the migration process. As a result, less downtime is experienced during the migration, resulting in a more efficient migration process and an improved virtualization end user experience.

FIG. 1 illustrates a virtualization system 100 in which embodiments may operate. It should be noted that other architectures for virtualization system 100 (also referred to herein as system 100) are possible, and that the implementation of a virtualization system utilizing embodiments of the disclosure are not necessarily limited to the specific architecture depicted by FIG. 1. Terms such as "machine," "device," "computer," "computer device," and "computing system" may be used interchangeably and synonymously throughout this document.

The virtualization system 100 may include a source host computer system 101a (the "source host 101a"), a destination host computer system 101b (the "destination host 101b"), one or more storage devices 102 (e.g., 102a, 102b), and a host controller 125, which may all be communicably connected over a network 103. Each of host machines 101a and 101b may be computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable disabling in-memory caching of a VM during migration. The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, host machines 101a and 101b may belong to a cluster comprising additional computer systems not depicted in FIG. 1, while in some other implementations, host machines 101a and 101b may be independent systems that are capable of communicating via network 103.

The source host 101a and the destination host 101b can include hardware components, such as one or more physical central processing units (CPUs) 130a-130b, memory 140a-140b, and other hardware components. One or more processors may be embodied as CPU 130a-130b, which can be a micro-processor, digital signal processor (DSP), or other processing component. CPU 130a-130b may process various received data and may carry out the code or instructions or one or more computer programs, for example, to provide input/output operations specified by the instructions.

Memory 140a-140b may include volatile memory devices (e.g., random access memory (RAM)), non-volatile memory devices (e.g., flash memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.). It should be noted that the fact that a single CPU 130a, 130b is depicted in FIG. 1 for each of host machines 101a and 101b is merely illustrative, and that in some other examples one or both of host machines 101a and 101b may comprise a plurality of CPUs. Similarly, in some other examples one or both of host machines 101a and 101b may comprise a plurality of storage devices, rather than a single storage device.

A source host 101a can include one or more VMs 110a and can execute an operating system 105a ("host OS") to manage its resources. A VM 110a can execute a guest OS (not shown). In one embodiment, the source host 101a executes a source hypervisor 115a to virtualize access to underlying source host hardware, making the use of the source VM 110a transparent to the guest OS running on VM 110a and users (e.g., a system administrator) of the source host 101a.

The CPU 130a, 130b may include an encrypted virtualization engine 135a, 135 that provides a security paradigm that encrypts VMs 110a, 110b to protect the VMs 110a, 110b from physical threats, as well as from other VMs 110a, 110b and the hypervisor 115a, 115b. In one implementation, the encrypted virtualization engine 135a, 135b is implemented as hardware circuitry of the CPU 130a, 130b. In some implementations, encrypted virtualization engine 135a, 135b is provided as firmware installed on the host machine 101a, 101b. The encrypted virtualization engine 135a, 135b may implement a Secure Encrypted Virtualization (SEV) feature set.

When encrypted virtualization is enabled, the encryption engine 135a, 135b can tag all code and data with a VM identifier (ID) that indicates which VM 110a, 110b that the data originated from or is intended for. This tag is kept with the data and prevents that data from being used by anyone other than the owner. Private memory of a VM 110a, 110b is encrypted with a VM-specific key 137a, 137b generated and maintained by the encryption engine 135a, 135b, where the VM-specific key 137a, 137b is associated with the VM ID of the VM 110a, 110b. The encryption engine 135a, 135b provides cryptographic isolation between VMs, as well as between the VMs and the hypervisor.

In one implementation, virtualization system 100 of FIG. 1 may perform a migration process, where the source VM 110a is migrated from the source host 101a to the destination host 101b using at least one storage device 102 (storage devices 102a, 102b). The destination host 110b can include one or more VMs 110b executing under the control of a corresponding destination hypervisor 115b. Storage device 102 can be accessible by the source host 101a and by the destination host 101b. The storage device 102 can be networked storage (e.g., network attached storage (NAS), storage area network (SAN). The storage device 102 can be located with the source host 101a, within the same network as the source host 101a, with the destination host 102b, within the same network as the destination host 102b, or with a third location, to name a few examples.

In one embodiment, the source hypervisor 115a may include a source migration agent 120a and the destination hypervisor 115b may include a corresponding destination migration agent 120b. The migration agent 120a, 120b can receive migration instructions from the host controller 125. The host controller 125 may reside on a designated computer system (e.g., a server computer, a desktop computer, etc.) or be part of the host machine 101a, 101b or another machine. Host controller 125 can manage VM migration by issuing instructions to hypervisor 115a, 115b. The host controller 125 can issue the migration instructions after a triggering event (e.g., a system administrator's migration request, system conditions, such as resource utilization by source host exceeding a threshold). The host controller 125 and migration agents 120 can work together to manage migrations, including determining a destination host machine 101b, coordinating one or more storage devices 102, scheduling migration, etc. Although shown as discrete components of the hypervisors 115a-115b, the migration agents 120a, 120b may be separate components coupled to hypervisors 115a-115b.

As previously discussed, a limitation of conventional encrypted virtualization is lack of support for live migration. Conventionally, when an encrypted VM is migrated, the source host executes a command to decrypt each page of the VM (using the guest-specific key of the encryption engine) and re-encrypt each page with a migration key (e.g., using a cryptographic context that is established with the destination host machine). However, as VM accesses can only be decrypted with the guest-specific key of the encryption engine, this means that the VM is not able to access those pages of the VM that have been re-encrypted with the migration key during migration.

In accordance with one example, hypervisor 115a, 115b is capable of copy and decrypt support for encrypted VMs. To provide the copy and decrypt support for encrypted VM, the CPU 130a is enhanced with a copy-and-encrypt command. The copy-and-encrypt command may be an instruction that is part of the instruction set of CPU 130a, 130b. When the encrypted virtualization engine 135a, 135b is implemented as firmware, this firmware may be enhanced to process and execute the copy-and-encrypt command of implementations of the disclosure. In some implementations, migration agent 120a, 120b of hypervisor 115a, 115b may provide the copy and decrypt support for encrypted VMs. For purposes of discussion herein, the migration agent 120a, 120b is described as performing implementations of the disclosure. However, implementations of the disclosure are not limited to the migration agent 120a, 120b performing aspects of the disclosure and the hypervisor 115a, 115b, more generally, is also capable of performing implementations of the disclosure.

In one implementation, the copy-and-encrypt command is supplied two pages (e.g., page 1, page 2) of memory as input parameters. Optionally, the copy-and-encrypt command may further be supplied with a migration key as an additional parameter. The migration key is an encryption key that is generated using a cryptographic context that is established between the source host 101a and the destination host 101b. The migration key is different than the VM-specific encryption key 137a, 137b utilized by the encrypted virtualization engine 135a, 135b to encrypt the VMs 110, 110b. In one implementation, the migration key is established by one or more of the source hypervisor 115a, destination hypervisor 115b, and/or host controller 125. The migration key may be maintained in a hardware location (e.g., register) of the host 101a, 101b for access by CPU 130a, 130b and/or encrypted virtualization engine 135a, 135b.

In one implementation, the copy-and-encrypt command causes the following operations to be performed:
(1) decrypt page 1 (e.g., first page) using the VM-specific encryption key 137a, 137b for the VM 110a, 110b;
(2) re-encrypt the decrypted contents using the migration key; and
(3) write the re-encrypted contents to page 2 (e.g., second page).

The copy- and encrypt command outputs page 2 having the decrypted content of page 1 re-encrypted with the migration key. As a result, the original page 1 having content encrypted with the VM-specific encryption key remains in place, and page 2 having content encrypted with the migration key is also provided.

Virtualization system 100 can perform a migration process to migrate an encrypted VM, such as source VM 110a at source host 101a, to destination host 101b to be executed as destination VM 110b. As part of the migration process, the source migration agent 120a may utilize the copy-and-encrypt command to migrate memory pages of the VM 110a.

Figure 2:
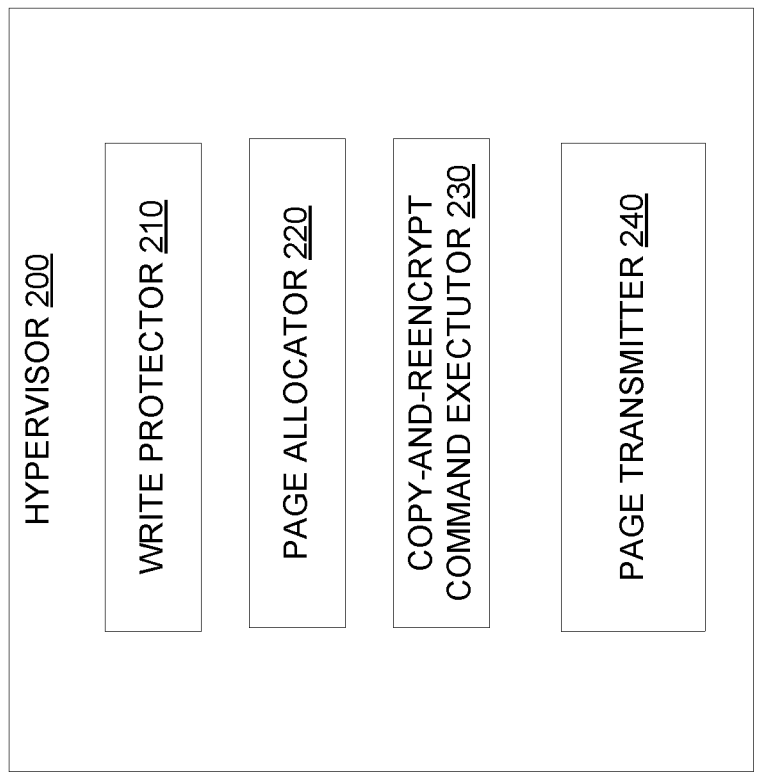
FIG. 2 schematically illustrates an example apparatus in which implementations of the disclosure may operate.

FIG. 2 is a block diagram depicting a hypervisor 200 to provide copy and decrypt support for encrypted VMs in accordance with an implementation of the disclosure. In one implementation, hypervisor 200 is the same as source hypervisor 115a described with respect to FIG. 1. Hypervisor 200 may include, but is not limited to, write protector 210, page allocator 220, copy-and-reencrypt command executor 230, and page transmitter 240. More or less components than illustrated as part of hypervisor 200 in FIG. 2 may be implemented in hypervisor 200, and implementations of the disclosure are not limited to those specifically described and illustrated herein. In some implementations, hypervisor 200 may include a migration agent (not shown) that performs all or part of the process described below.

When a memory page of the VM 110a is identified for migration as part of the migration process, hypervisor 200 may utilize its components to cause the encrypted page to be migrated to destination host 101b. The write protector 210 can write protect the page (page 1). In one implementation, the page is write-protected in the extended page tables (EPT) associated with the source VM 110a. The page allocator 220 may then allocate an extra page (page 2) for the VM 110a. The copy-and-reencrypt command generator 230 may then execute the copy-and-encrypt command using page 1 and page 2 as input parameters to the command. The copy-and-reencrypt command may perform operations as described above to output page 2 having contents reencrypted with the migration key for the migration process. Lastly, the page transmitter 240 can send (e.g., transmit) contents of outputted page 2 (from the command) to the destination host 101b.

Referring back to FIG. 1, if a write fault is detected during the migration process, the source migration agent 120a may record the page address associated with the write fault and remove the write protection from the page. At a later stage in the migration process, the page migration process described above that utilizes the copy-and-encrypt command may be performed again for all of the pages that were detected as modified via the write fault.

When the destination migration agent 120b receives the memory pages of the VM 110a encrypted with the migration key, it can decrypt these pages with the migration key and utilize the encrypted virtualization engine 135b at destination host 101b to re-encrypt the memory pages with the VM-specific encryption key 137b. When the migration process has completed, destination source migration agent 120b and/or destination hypervisor 115b can then initiate the VM as destination VM 110b on destination host machine 101b.

In some implementations, the copy-and-encrypt command may be utilized in a non-live migration situation. For example, during a final stage of migration when execution of the VM is stopped to migrate the remaining pages of VM memory, the copy-and-encrypt command may be invoked to encrypt the remaining memory pages in place without having extra copies of the pages stored in memory. In addition, the copy-and-encrypt command may be utilized for memory deduplication technique. For example, the command may utilized as part of a kernel samepage merging (KSM) feature.

Figure 3:
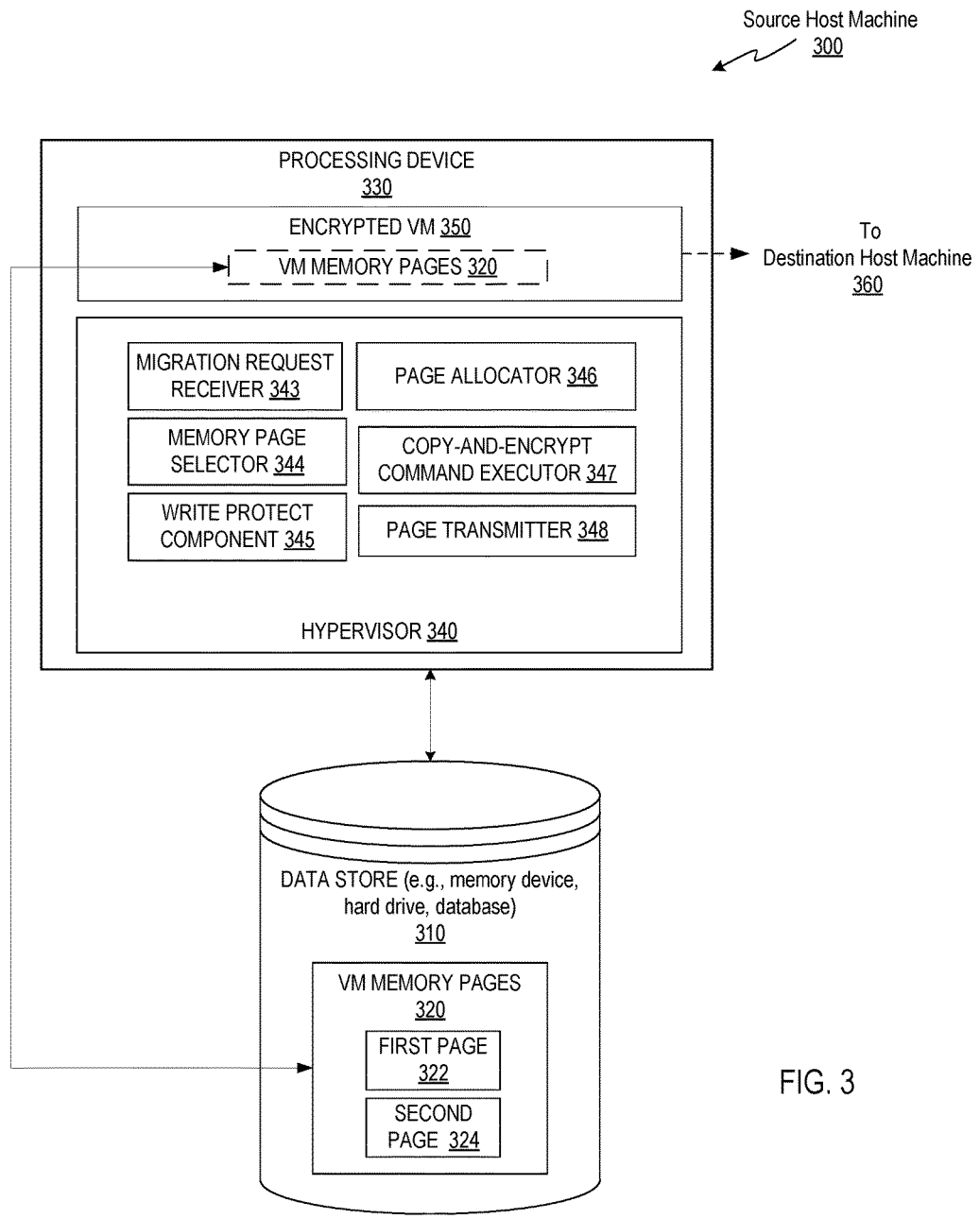
FIG. 3 is a block diagram of a migration agent of a hypervisor providing copy and decrypt support for encrypted virtual machines, in accordance with one or more aspects of the disclosure.

FIG. 3 illustrates an example source host machine 300 in which implementations of the disclosure may operate. Source host machine 300 may be the same or similar to the source host machine 101a within virtualization system 100 described with respect to FIG. 1. Source host machine 300 may include components and modules for copy and decrypt support for encrypted VMs. The source host machine 300 may include a data store 310 that can store VM memory pages 320. In one implementation, the VM memory pages 320 is memory (e.g., a page cache) of the source host machine 300 virtualized for use by encrypted VM 350. The data store 310 may include any non-persistent data storage (e.g., memory), persistent data storage (e.g., flash storage, hard drive, tape), other medium, or combination thereof that is capable of storing instructions for carrying out the operations of the components and modules discussed herein. The devices 360 may include peripheral devices (e.g., display, mouse, printer, etc.), peripheral component interconnect (PCI) devices, and/or storage devices used by the source host machine 300.

The source host machine 300 may include a processing device 330 with a hypervisor 340 and an encrypted VM 350. The hypervisor 340 may implement copy and decrypt support for encrypted VM 350 during migration of the encrypted VM 350 from the source host machine 300 to a destination host machine 360. The hypervisor 340 may include a migration request receiver 343, a memory page selector 344, a write protect component 345, a page allocator 346, a copy-and-encrypt executor 347, and a page transmitter 348.

The migration request receiver 343 may receive a request to migrate the encrypted VM 350 to a destination host machine 360. The memory page selector 344 may identify a first page 322 of memory 320 of the encrypted VM 350 on the source host machine 300 for migration. The write protect component 345 may write-protect the first page 322. The page allocator 346 may allocate a second page 324. The copy-and-encrypt command executor 347 may execute a copy-and-reencrypt command using the first page 322 and the second page 324 as parameters for the copy-and-reencrypt command. The page transmitter may transmit contents of the second page 324 to the destination host machine 360.

Figure 4:
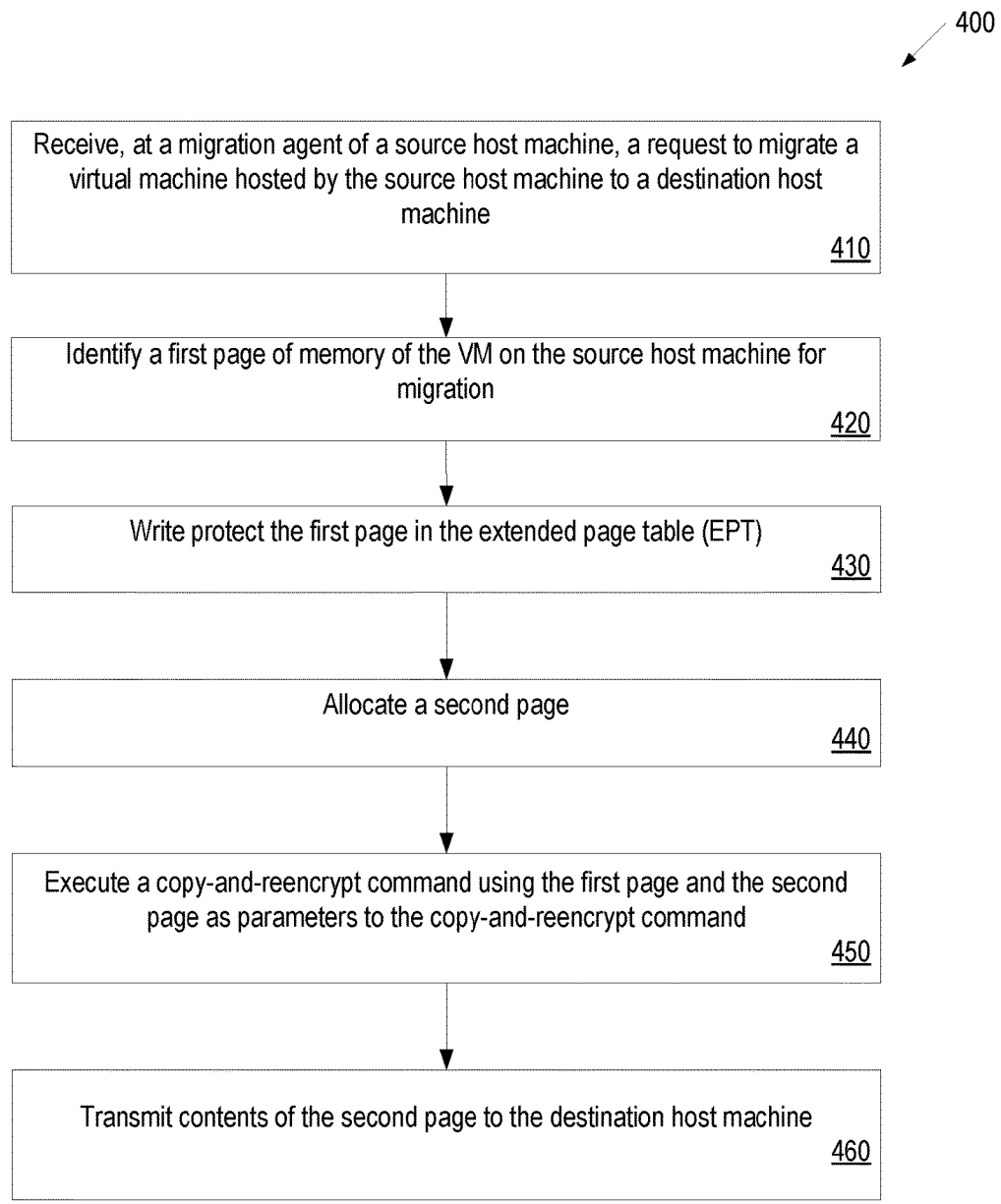
FIG. 4 depicts a flow diagram of a method of copy and decrypt support for encrypted virtual machines utilizing a copy-and-encrypt hardware command, in accordance with one or more aspects of the disclosure.
Figure 5:
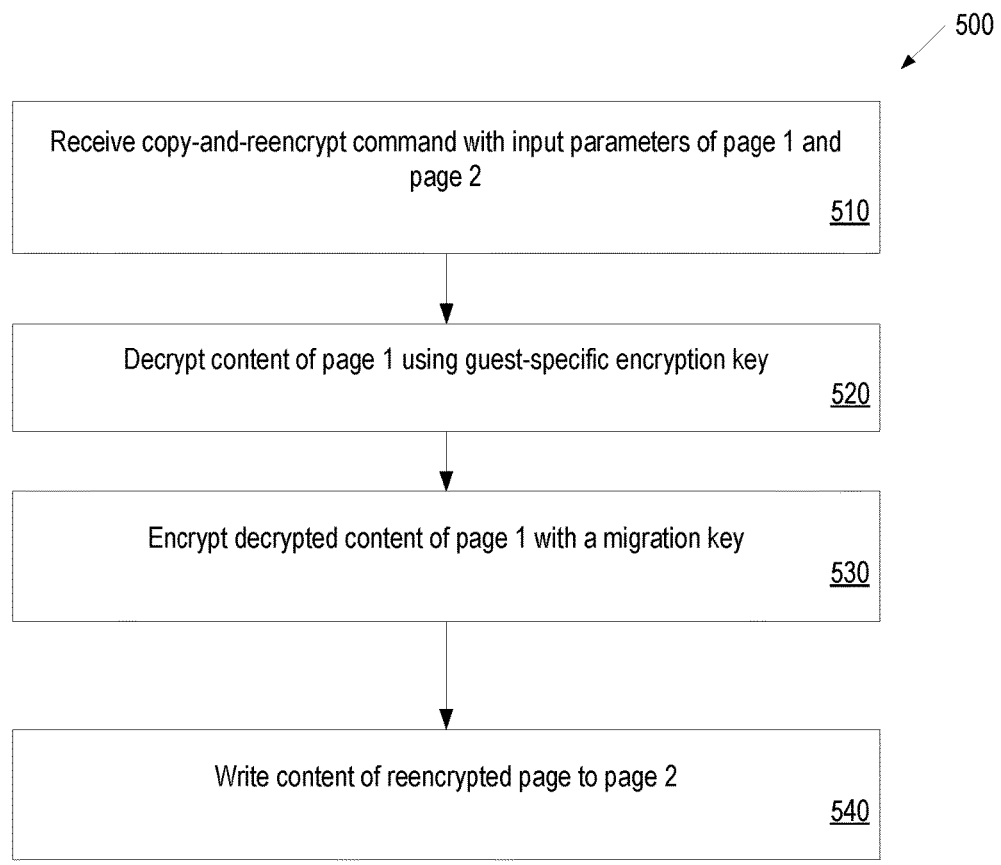
FIG. 5 depicts a flow diagram of a method of performing a copy-and-encrypt command on computing hardware, in accordance with one or more aspects of the disclosure.

FIGS. 4 and 5 depict flow diagrams for illustrative examples of methods 400 and 500 for copy and decrypt support for encrypted VMs. Method 400 includes a method of copy and decrypt support for encrypted virtual machines utilizing a copy-and-encrypt hardware command. Method 500 includes a method of performing a copy-and-encrypt command on computing hardware. Methods 400 and 500 may be performed by processing devices that may comprise hardware (e.g., circuitry, dedicated logic), computer readable instructions (e.g., run on a general purpose computer system or a dedicated machine), or a combination of both. Methods 400 and 500 and each of their individual functions, routines, subroutines, or operations may be performed by one or more processors of the computer device executing the method. In certain implementations, methods 400, and 500 may each be performed by a single processing thread. Alternatively, methods 400 and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, method 400 may be performed by source hypervisor 115a, as shown in FIG. 1. Method 400 may begin at block 410, where a processing device may receive, at a source host machine hosting a virtual machine (VM), a request to migrate the VM to a destination host machine. At block 420, the processing device may identify a first page of memory of the VM on the source host machine for migration. In one implementation, the first page of memory is encrypted with a VM-specific encryption key. At block 430, the processing device may write-protect the first page.

Subsequently, at block 440, the processing device may allocate a second page. Then, at block 450, the processing device may execute a copy-and-reencrypt command using the first page and the second page as parameters for the copy-and-reencrypt command. In one implementation, the copy-and-reencrypt command is to output the second page comprising contents of the first page re-encrypted with a migration key. Lastly, at block 460, the processing device may transmit contents of the second page to the destination host machine.

Referring to FIG. 5, method 500 may be performed by the CPU 130a, 130b, as shown in FIG. 1. Method 500 may begin at block 510, where a processing device may receive a copy-and-reencrypt command having input parameters of a first page and a second page. At block 520, the processing device may decrypt, in view of the copy-and-reencrypt command, encrypted contents of the first page using a virtual machine (VM)-specific encryption key. Subsequently, at block 530, the processing device may encrypt the decrypted contents of the first page using a migration key. Lastly, at block 540, the processing device may write the re-encrypted contents of the first page to the second page.

Figure 6:
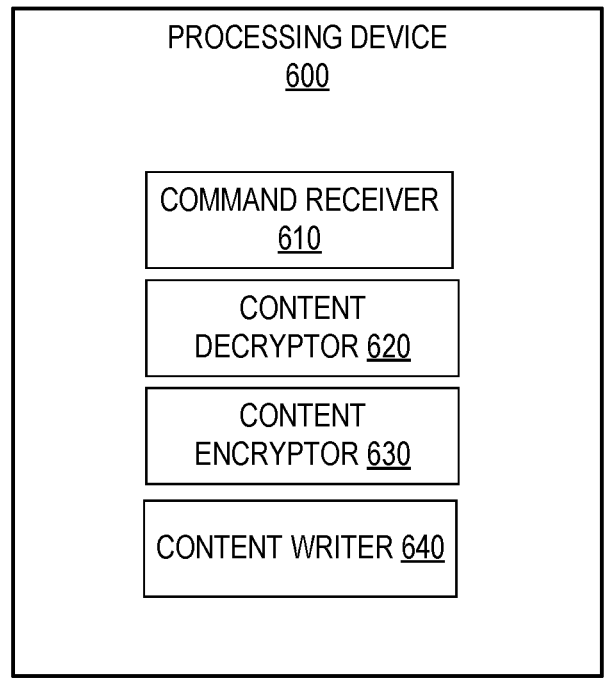
FIG. 6 is a block diagram of a processing device for executing a copy-and-encrypt command, in accordance with one or more aspects of the disclosure.

FIG. 6 is a block diagram of a processing device 600 for executing a copy-and-reencrypt command, in accordance with one or more aspects of the disclosure. Processing device 600 may be the same or similar to the CPU 130a, 130b within virtualization system 100 described with respect to FIG. 1. Processing device 600 may include components and modules for executing a copy-and-reencrypt command. Processing device 600 may process various received data and may execute the code or instructions of one or more computer programs, for example, to provide input/output operations specified by the instructions.

Processing device 600 may include hardware circuitry ("circuits") to provide components including, but not limited to, a command receiver 610, a content decryptor 620, a content encrpytor 630, and content writer 640. The command receiver 610 may receive a copy-and-reencrypt command having input parameters of a first page and a second page. The content decrpytor 620 may decrypt, in view of the copy-and-reencrypt command, encrypted contents of the first page using a virtual machine (VM)-specific encryption key. The content encryptor 630 may encrypt the decrypted contents of the first page using a migration key. The content writer 640 may write the re-encrypted contents of the first page to the second page.

Figure 7:
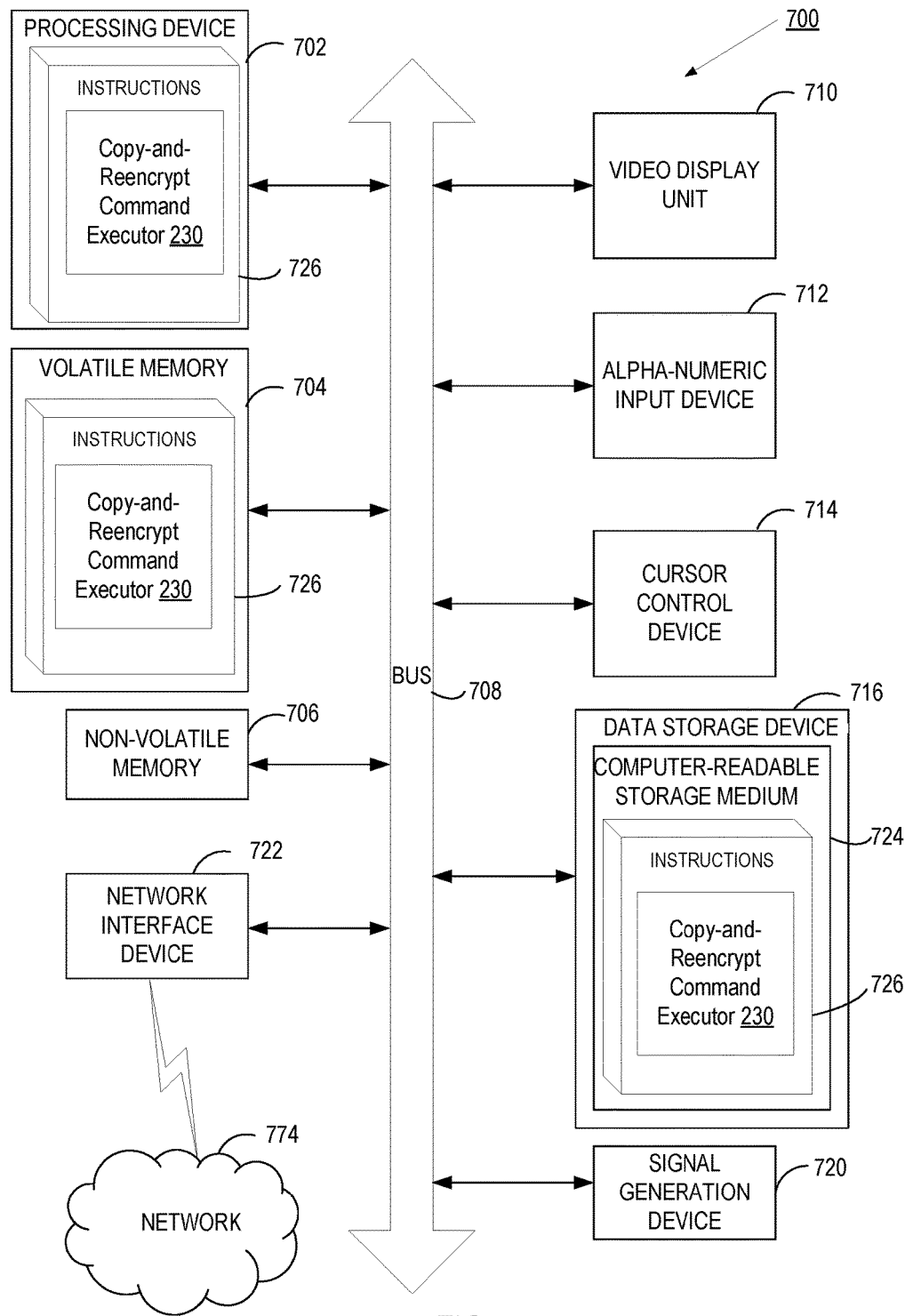
FIG. 7 depicts a block diagram of an illustrative computing device operating in accordance with the examples of the disclosure.

FIG. 7 depicts a block diagram of a computer system operating in accordance with one or more aspects of the disclosure. In various illustrative examples, computer system 700 may correspond to a computing device, such as source host 101a or destination host 101b of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for a copy-and-reencrpyt command executor 230 of FIG. 2 for implementing methods 400 and/or 500 of FIGS. 4 and 5.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
  receiving, by a processing device at a source host machine hosting a virtual machine (VM), a request to migrate the VM to a destination host machine;
  identifying a first page of memory of the VM on the source host machine for migration, the first page of memory encrypted with a VM-specific encryption key, wherein the VM-specific encryption key is generated and maintained by an encryption engine of the source host machine;

write-protecting the first page;

allocating a second page;

executing a copy-and-reencrypt command using the first page and the second page as parameters for the copy-and-reencrypt command, the copy-and-reencrypt command to output the second page comprising contents of the first page re-encrypted with a migration key while the first page of memory remains in place encrypted with the VM-specific encryption key, wherein the migration key is different than the VM-specific encryption key and comprises an encryption key generated using a cryptographic context that is established with the destination host machine, and wherein the copy-and-reencrypt command to cause the processing device to:

decrypt contents of the first page using the VM-specific encryption key;

encrypt the decrypted contents of the first page with the migration key; and write the contents of the re-encrypted first page to the second page; and transmitting contents of the second page to the destination host machine.

2. The method of claim 1, wherein the first page is write-protected in an extended page table (EPT) maintained by the source host machine.

3. The method of claim 1, wherein the VM is an encrypted VM.

4. The method of claim 1, wherein the copy-and-reencrypt command comprises an instruction executable by an encryption engine comprising firmware installed on the source host machine.

5. The method of claim 1, wherein the copy-and-reencrypt command comprises an instruction executable by the processing device, the copy-and-reencrypt command part of an instruction set of the processing device.

6. The method of claim 1, wherein the receiving, identifying, write-protecting, allocating, executing, and transmitting are performed by a migration agent of a hypervisor of the source host machine.

7. The method of claim 1, wherein the migration key is maintained in a hardware location of the source host machine.

8. The method of claim 1, wherein the migration key is supplied as an additional parameter to the copy-and-encrypt command.

9. A source host machine, comprising, a memory; and a processing device operatively coupled to the memory, the processing device to:

receive a request to migrate an encrypted VM hosted by the source host machine to a destination host machine;

identify a first page of memory of the encrypted VM on the source host machine for migration, the first page of memory encrypted with a VM-specific encryption key, wherein the VM-specific encryption key is generated and maintained by an encryption engine of the source host machine;

write-protect the first page;

allocate a second page;

execute a copy-and-reencrypt command using the first page and the second page as parameters for the copy-and-reencrypt command, the copy-and-reencrypt command to output the second page comprising contents of the first page re-encrypted with a migration key while the first page of memory remains in place encrypted with the VM-specific encryption key, wherein the migration key is different than the VM-specific encryption key and comprises an encryption key generated using a cryptographic context that is established with the destination host machine, and wherein the copy-and-reencrypt command to cause the processing device to:

decrypt contents of the first page using the VM-specific encryption key;

encrypt the decrypted contents of the first page with the migration key; and write the contents of the re-encrypted first page to the second page; and transmit contents of the second page to the destination host machine.

10. The source host machine of claim 9, wherein the first page is write-protected in an extended page table (EPT) maintained by the source host machine.

11. The source host machine of claim 9, wherein the copy-and-reencrypt command comprises an instruction executable by an encryption engine comprising firmware installed on the source host machine.

12. The source host machine of claim 9, wherein the copy-and-reencrypt command comprises an instruction executable by the processing device, the copy-and-reencrypt command part of an instruction set of the processing device.

13. The source host machine of claim 9, wherein the receiving, identifying, write-protecting, allocating, executing, and transmitting are performed by a migration agent of a hypervisor of the source host machine.

14. The source host machine of claim 9, wherein the migration key is maintained in a hardware location of the source host machine.

15. The source host machine of claim 9, wherein the migration key is maintained in a hardware location of the source host machine.

16. A non-transitory machine-readable storage medium storing instructions that cause a processing device to:

receive, by the processing device of a source host machine hosting a virtual machine (VM), a request to migrate the VM to a destination host machine;

identify a first page of memory of the VM on the source host machine for migration, the first page of memory encrypted with a VM-specific encryption key, wherein the VM-specific encryption key is generated and maintained by an encryption engine of the source host machine;

write-protect the first page;

allocate a second page;

execute a copy-and-reencrypt command using the first page and the second page as parameters for the copy-and-reencrypt command, the copy-and-reencrypt command to output the second page comprising contents of the first page re-encrypted with a migration key while the first page of memory remains in place encrypted with the VM-specific encryption key, wherein the migration key is different than the VM-specific encryption key and comprises an encryption key generated using a cryptographic context that is established with the destination host machine, and wherein the copy-and-reencrypt command to cause the processing device to:

decrypt contents of the first page using the VM-specific encryption key;

encrypt the decrypted contents of the first page with the migration key; and write the contents of the re-encrypted first page to the second page; and transmitting contents of the second page to the destination host machine.

17. The non-transitory machine-readable storage medium of claim 16, wherein the copy-and-reencrypt command comprises an instruction executable by an encryption engine comprising firmware installed on a computing device comprising the processing device.

18. The non-transitory machine-readable storage medium of claim 16, wherein the copy-and-reencrypt command comprises an instruction executable by the processing device, the copy-and-reencrypt command part of an instruction set of the processing device.

19. The non-transitory machine-readable storage medium of claim 16, wherein the receiving, identifying, write-protecting, allocating, executing, and transmitting are performed by a migration agent of a hypervisor of the source host machine.

20. The non-transitory machine-readable storage medium of claim 16, wherein the first page is write-protected in an extended page table (EPT) maintained by the source host machine.

* * * * *